Feb. 14, 1956  A. W. COOK  2,734,780
METAL WHEEL
Filed Aug. 21, 1952  2 Sheets-Sheet 2
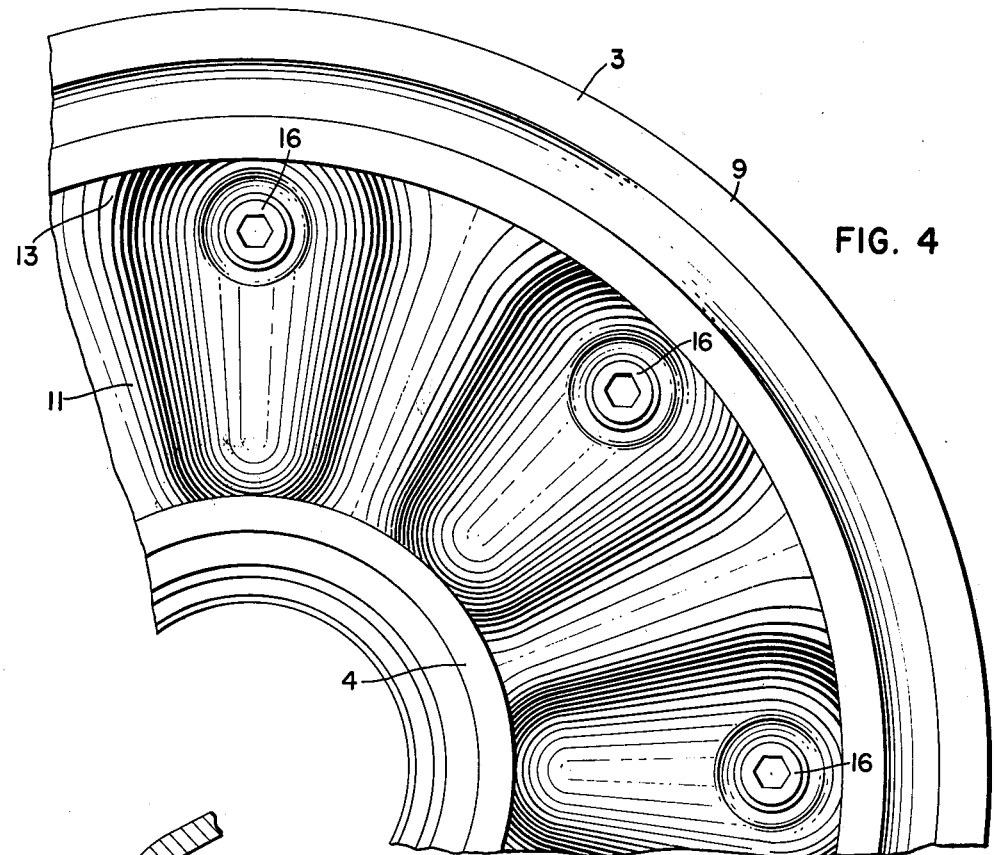
FIG. 4
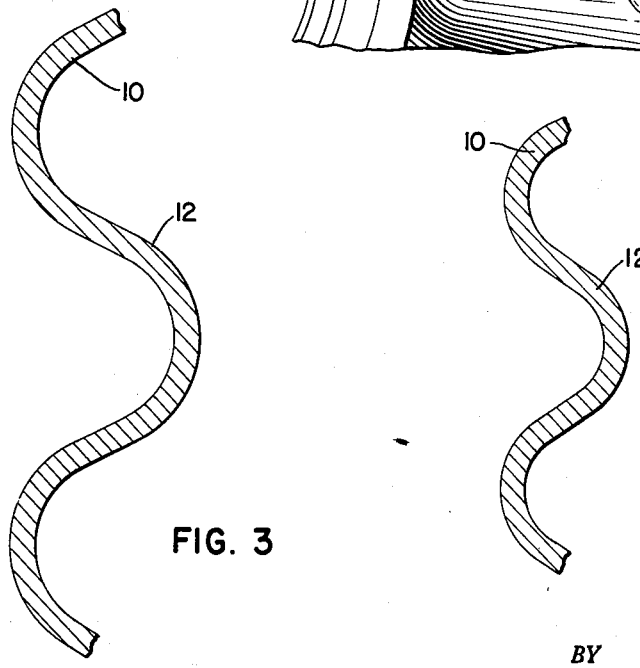
FIG. 2
FIG. 3
INVENTOR.
ALBERT W. COOK
BY
R. L. Miller
ATTORNEY

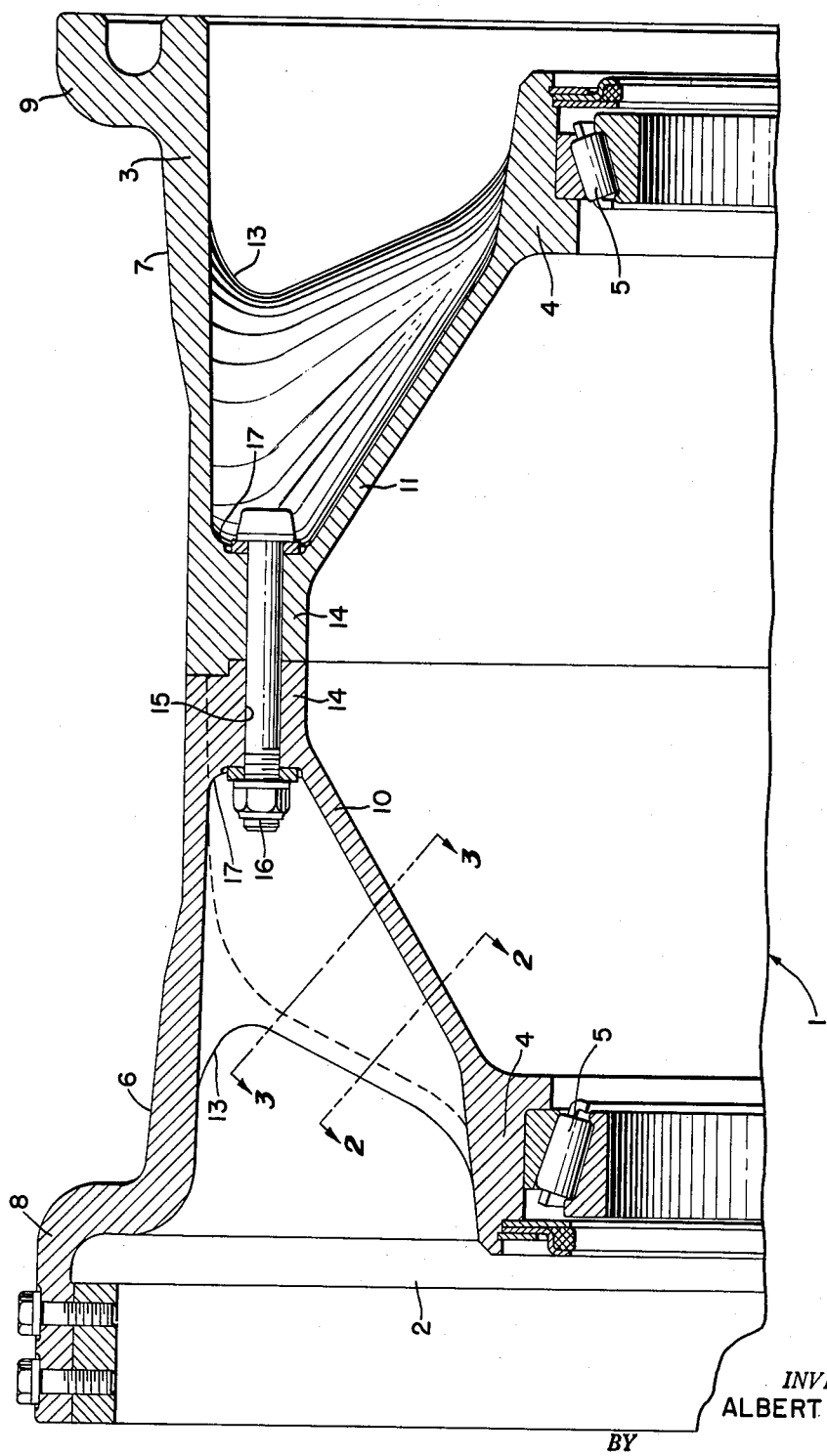

United States Patent Office 2,734,780
Patented Feb. 14, 1956

2,734,780

METAL WHEEL

Albert W. Cook, Akron, Ohio, assignor, by mesne assignments, to The Goodyear Tire & Rubber Company, a corporation of Ohio Application August 21, 1952, Serial No. 305,550

3 Claims. (Cl. 301—63)

This invention relates to metal wheels, and particularly to aircraft wheels.

At the present time, wheels for use on aircraft are made from lightweight metal by either casting or forging operations. The wheels may be made in two sections, each of which comprises a continuous hub that is connected to a continuous rim by a web section. In some instances, these connecting webs in the wheel sections have been of conical shape with reinforcing ribs provided on the cones, or the webs may have been of spoked construction, with the spokes being of T-shape in section. The prior types of wheel sections usually have included quite a few sharp corners at the connections of the webs to the rims, or the other portions of the wheels where high stresses are concentrated.

It will be realized that the wheels in aircraft may be subjected to very high impact or other stresses when the aircraft is landing and prior types of wheel constructions have failed after relatively short service lives. These failures may be due to excessive stress concentrations in the wheel, metal fatigue failure in the wheel, or for other reasons.

The general object of the present invention is to provide a new and improved type of a wheel wherein better metal quality is obtained in the wheel section and where the wheel has a greatly increased roll or operative life.

Another object of the invention is to provide a new type of wheel particularly suited for use in aircraft wherein the components of the wheel have reduced stress concentrations therein in comparison with prior types of wheel constructions.

A specific object of the invention is to make the tie bolt joints in a split wheel stronger to give the wheel better operating characteristics.

Another object of the invention is to provide a wheel section the components of which are all integral and are made by a casting operation wherein the design of the wheel is such that the wheel is easy to cast and with metal having a high pouring temperature being able to be used in the manufacture of the wheel.

Still another object of the invention is to provide a new type of a wheel wherein the web connecting the hub to the rim portion of the wheel is of substantially wave shape in any short section taken normally to the surface of the web.

The foregoing and other objects and advantages of the invention will be made more apparent as the specification proceeds.

For a better understanding of the invention, reference is directed to the structure shown in the accompanying drawings illustrating the currently preferred embodiment of the invention, and wherein:

Fig. 1 is a vertical section through a half of the wheel of the invention;

Figs. 2 and 3 are fragmentary sections taken on lines 2—2 and 3—3 of Fig. 1, respectively; and Fig. 4 is a fragmentary side elevation of a part of the wheel of Fig. 1.

The new wheel of the invention usually is made from a pair of wheel sections each of which has a hub, a rim, and a continuous web extending from the hub to the rim in a direction axially inwardly and radially outwardly of the wheel. The web is connected to the rim at axially spaced portions thereof and with the web being of substantially wave shape in a section normal to the surface of the web for any short section taken therethrough. Usually the web connects to circumferentially spaced bosses provided on radially inner portions of the rim and such bosses have tie bolt receiving holes extending axially therethrough, the bosses being smoothly blended into the webs by filleted connecting portions.

The wheel of the invention is indicated as a whole by the numeral 1 and it is shown as comprising two wheel sections 2 and 3 with each wheel section substantially comprising half the wheel 1 as split at its center in a plane normal to the rotative axis of the wheel. The wheel sections 2 and 3 are of substantially the same but reversed constructions, but may be of dissimilar constructions when desired.

Each of the wheel sections includes a hub 4 within which suitable bearing means 5 are positioned to engage an axle or wheel spindle. Likewise, each wheel section 2 and 3 includes a rim section 6 and 7, respectively, with the rim section 6 having a flange 8 at one edge thereof and with a similar flange 9 being formed on the rim section 7 whereby the rim sections 6 and 7 cooperate to provide a tire positioning him having flanges on both edges thereof.

Usually, the wheel sections 2 and 3 are cast from metal but they may be forged or fabricated, and they have conical webs 10 and 11, respectively, formed integrally with the associated hub and rim sections.

As an important feature of the invention by which an improved wheel construction is achieved, the webs 10 and 11 are both made of such shape that any short section thereof taken on planes as indicated by lines 2—2 and 3—3 of the drawings are of wave shape in section. It may be said that the webs 10 and 11 are of substantially wave shape in any section taken normally to a radius of the wheel 1, but the true wave configuration of the webs is best shown by taking a section through the web normal to the line of average inclination of the web, as such line would be the center line of the wave shapes formed in such webs.

Fig. 2 of the drawings clearly shows that waves or corrugations 12 are provided in the web 10 and it will be seen that these corrugations become both deeper and wider as the web 10 approaches the rim section 6 to connect to and reinforce such rim section adjacent the axially inner end thereof. Fig. 1 of the drawings shows that the actual connection between the web 10 and the rim section 6 is made by means of a filleted connecting section 13 that doubles back axially toward the outer end of the rim and the hub, and the web 11 connects to the rim section 7 in a similar manner. Fig. 1 of the drawing best shows that the conical webs 10 and 11 both extend generally radially outwardly and axially inwardly of the wheel. The webs 10 and 11 are continuous and have complete annular engagement with both the hub and the rim section between which they extend.

The securement of the wheel sections 2 and 3 together is achieved by use of bosses 14 that are formed on radially inner portions of the rim sections 6 and 7 in circumferentially spaced and balanced relation. These bosses 14 have tie-bolt receiving holes 15 extending axially therethrough and the bosses formed on the different wheel sections are axially aligned when the wheel sections are brought into engagement so that tie bolts 16 can extend through such holes 15 and fixedly secure the wheel sections together. It will be noted that the bosses 14 connect to the rim sections and the portions of the web adjacent the sides of the bosses by filleted connecting portions indicated at 17 so that a smooth joint is provided between the bosses and the parts of the wheel sections connecting thereto. The radially inner portions of the bosses 14 comprise direct extensions of the radially inner parts of the web sections 10 and 11.

In Fig. 4 the development of the corrugations is shown as such webs approach the rim 7.

By the use of the novel type of webs disclosed herein, it is possible to obtain a stronger wheel than has been made heretofore without the use of any greater weight of metal in the wheel. The simplicity of the wheel design together with the reduction in stress concentrations in the wheel has provided a wheel which gives, in test runs made of the wheel, five to six times the operative or roll life of a wheel made in accordance with prior conventional practices. The wheel of the invention is not difficult or expensive to produce and has very desirable physical characteristics so that it is thought that the objects of the invention have been achieved.

While a certain representative embodiment and details have been shown for the purpose of illustrating the invention, it will be apparent to those skilled in this art that various changes and modifications may be made therein without departing from the spirit or scope of the invention.

Having thus described my invention, what I claim is:

1. A wheel assembly having a rim, axially-spaced hubs, and continuous webs extending from the hubs axially inwardly and radially outwardly to the rim, the wheel being split circumferentially into two parts, and axially-parallel bolts positioned at circumferentially spaced points relatively closely under the rim securing the wheel parts together, the assembly being characterized by forming the webs with circumferentially-extending waves increasing in circumferential length and axial height radially outwardly of the web, the waves of opposed webs substantially bottoming against each other in the region of the split and the bolts extending through the bottoming wave portions of the webs.

2. A wheel assembly having a rim, axially-spaced hubs, and continuous webs, extending from the hubs axially-inwardly and radially outwardly to the rim, the wheel being split circumferentially into two parts, and axially-parallel bolts positioned at circumferentially spaced points relatively closely under the rim securing the wheel parts together, the assembly being characterized by forming the webs with circumferentially-extending waves increasing in circumferentially length and axial height radially outwardly of the web, the waves of opposed webs substantially bottoming against each other in the region of the split and the bolts extending through the bottoming wave portions of the webs, and interlocking bosses formed on the rim and webs adjacent the bolts.

3. A wheel assembly having a rim, axially-spaced hubs, and continuous webs, extending from the hubs axially inwardly and radially outwardly to the rim, the wheel being split circumferentially into two parts, and axially-parallel bolts positioned at circumferentially spaced points relatively closely under the rim securing the wheel parts together, the assembly being characterized by forming the webs with circumferentially-extending waves increasing in circumferentially length and axial height radially outwardly of the web, the waves of opposed webs substantially bottoming against each other in the region of the split and the bolts extending through the bottoming wave portions of the webs, and interlocking bosses formed on the rim and webs adjacent the bolts, each web being cast integrally with its rim and hub.

References Cited in the file of this patent
UNITED STATES PATENTS

| | | |
|---|---|---|
| 8,455 | Severson | Oct. 21, 1851 |
| 1,491,560 | Slick | Apr. 22, 1924 |
| 2,230,193 | Shinn | Jan. 28, 1941 |
| 2,308,379 | Mercier | Jan. 12, 1943 |
| 2,440,858 | Hollerith | May 4, 1948 |